(12) United States Patent
Merdjan

(10) Patent No.: US 7,151,327 B2
(45) Date of Patent: Dec. 19, 2006

(54) SYSTEM AND METHOD FOR SUPPLY DISTRIBUTION

(76) Inventor: Bruce Merdjan, 21-26 51 Ave., Bayside, NY (US) 11364

( * ) Notice: Subject to any disclaimer, the term of this patent is extended or adjusted under 35 U.S.C. 154(b) by 465 days.

(21) Appl. No.: 10/600,396

(22) Filed: Jun. 20, 2003

(65) Prior Publication Data

US 2005/0116543 A1 Jun. 2, 2005

(51) Int. Cl.
*H02J 3/14* (2006.01)

(52) U.S. Cl. .............................. 307/38; 307/35; 700/292

(58) Field of Classification Search ................ 307/36, 307/38, 35; 700/295, 292
See application file for complete search history.

(56) References Cited

U.S. PATENT DOCUMENTS

| | | | | |
|---|---|---|---|---|
| 4,211,933 A | | 7/1980 | Heges et al. ................... 307/35 |
| 4,336,462 A | * | 6/1982 | Hedges et al. ................ 307/35 |
| 4,510,398 A | | 4/1985 | Culp et al. ..................... 307/35 |
| 4,694,192 A | | 9/1987 | Payne et al. ................... 307/39 |
| 4,749,992 A | | 6/1988 | Fitzemeyer et al. ... 340/870.02 |
| 4,958,055 A | | 9/1990 | Shim ........................ 219/10.55 |
| 5,126,934 A | | 6/1992 | MacFadyen ................. 364/140 |
| 5,281,859 A | | 1/1994 | Crane .......................... 307/139 |
| 5,436,510 A | | 7/1995 | Gilbert ......................... 307/38 |
| 5,754,445 A | | 5/1998 | Jouper ......................... 364/492 |
| 5,801,460 A | | 9/1998 | Diemer ........................ 307/129 |
| 5,805,458 A | | 9/1998 | McNamara .................. 364/483 |
| 5,818,725 A | | 10/1998 | McNamara .................. 364/483 |
| 5,831,345 A | * | 11/1998 | Michaud ....................... 307/38 |
| 5,844,326 A | | 12/1998 | Proctor et al. ................ 307/34 |
| 5,898,233 A | | 4/1999 | Sawaki ......................... 307/38 |
| 5,986,353 A | * | 11/1999 | Kohler .......................... 307/38 |
| 6,018,690 A | | 1/2000 | Saito et al. .................. 700/295 |
| 6,137,188 A | | 10/2000 | Mitchell et al. .............. 307/29 |
| 6,216,479 B1 | * | 4/2001 | Elwood ......................... 307/41 |
| 6,301,674 B1 | | 10/2001 | Saito et al. .................. 713/340 |
| 6,373,150 B1 | | 4/2002 | Fuller ........................... 307/39 |
| 6,460,565 B1 | | 10/2002 | Titus ........................... 137/487 |
| 6,493,643 B1 | | 12/2002 | Aisa ............................. 702/60 |
| 6,501,195 B1 | | 12/2002 | Barton ........................ 307/125 |
| 6,766,222 B1 | * | 7/2004 | Duley .......................... 700/295 |
| 6,891,478 B1 | * | 5/2005 | Gardner ....................... 307/35 |
| 2002/0108065 A1 | | 8/2002 | Mares ......................... 713/300 |

* cited by examiner

*Primary Examiner*—Brian Sircus
*Assistant Examiner*—Andrew Deschere
(74) *Attorney, Agent, or Firm*—Jack Schwartz & Associates

(57) ABSTRACT

A system and method for distributing a supply to plurality of machinery or appliances. The supply may be any of oil, gas, electrical power, water, heated and cooled air, etc. the plurality of appliances can include any of gas and oil powered devices, electrical devices, rooms having HVAC ductwork, etc. The distribution of the operating supply is provided by prioritizing the appliances with a predetermined priority. The appliances are connected in a series connection in order of priority. When any appliance is determined to be in an "ON" state of operation subsequently connected appliances are prevented from operating. Alternatively, when more than one appliance is able to operate simultaneously using the operating supply, the appliances may be divided into a plurality of groups. The plurality of groups include a group for each possible combination of appliances and each group is prioritized. Operating supply is provided to the group having the highest priority with all appliances in the group being determined to be in an "ON" state of operation.

20 Claims, 9 Drawing Sheets

SYSTEM AND METHOD FOR SUPPLY DISTRIBUTION

BACKGROUND OF THE INVENTION

1. Field of the Invention

The present invention relates generally to resource sharing systems and, more specifically, to energy supply distribution systems utilizing pre-determined truth tables to prioritize and divide an operational supply among a plurality of units or appliances. The invention discloses managing distribution of a supply such as electrical power, combustible fuel, e.g., gas and oil, water, compressed air, and heat to maintain a balance between the supply and the demand. The management of supply distribution to multiple appliances, areas, or machinery may be required due to capacity limits on the power and utility supply grid or a limited amount of heat capacity or air supply distribution system within a home or building available for use. A valve or control will selectively permit use of appliances, ductwork, or machinery in a manner as not to exceed the supply capacity of the power grid, utility grid or the distribution. A priority may be assigned as to which appliance, ductwork or machine will be permitted to operate and which appliance, ductwork or machine will be forced to idle or shut down due to supply limitations.

2. Description of the Prior Art

Presently, avoiding or delaying upgrading of the utility grid or resource distribution within a large building or one-family home is not possible. This is normally due to increased energy demands by the occupant. The upgrading of the power supply or utility grid is usually extremely costly. Upgrading an electrical riser, gas supply, water supply, ductwork for heating, ventilating and air conditioning (HVAC), compressed air, or other utility within a home can be very costly for both the utility company and the occupant. Additionally such upgrading can be disruptive of daily routines.

Numerous other resource-sharing methods are available in the prior art. Typical of these is U.S. Pat. No. 4,211,933 issued to Hedges, et al. on Jul. 8, 1980. Additional patents include U.S. Pat. No. 4,510,398 issued to Culp et al. on Apr. 9, 1985; U.S. Pat. No. 5,126,934 issued to MacFadyen on Jun. 30, 1992; U.S. Pat. No. 5,754,445 issued to Jouper et al. on May 19, 1998; U.S. Pat. No. 5,844,326 issued to Proctor et al. on Dec. 1, 1998; U.S. Pat. No. 6,460,565 issued to Titus on Oct. 8, 2002; and U.S. Pat. No. 6,493,643 issued to Aisa on Dec. 10, 2002. While these resource-sharing methods may be suitable for the particular purpose which they address, they would not be as suitable for the purposes of energy supply distribution as the present invention.

SUMMARY OF THE PRESENT INVENTION

The present invention relates generally to resource sharing systems and, more specifically, to energy supply distribution systems utilizing pre-determined truth tables to prioritize and divide an operational supply among a plurality of units or appliances. The invention discloses managing distribution of a supply such as electrical power, combustible fuel, e.g., gas and oil, water, compressed air, and heat to maintain a balance between the supply and the demand. The management of supply distribution to multiple appliances, areas, or machinery may be required due to capacity limits on the power and utility supply grid or a limited amount of heating capacity or air supply distribution system within a home or building available for use. A valve or control will selectively permit use of appliances, ductwork, or machinery in a manner as not to exceed the supply capacity of the power grid, utility grid or the distribution. A priority may be assigned as to which appliance, ductwork or machine will be permitted to operate and which appliance, ductwork or machine will be forced to idle or shut down due to supply limitations.

A primary object of the present invention is to provide a system and method of energy supply distribution able to overcome the shortcomings of the prior art.

Another object of the present invention is to provide a system and method of energy supply distribution able to eliminate the need for an otherwise required supply grid upgrade.

A further object of the present invention is to provide a system and method of energy supply distribution able to permit the installation of smaller pipes, ducts, wires, risers or equipment in houses or buildings.

Still yet another object of the present invention is to provide a system and method of energy distribution utilizing truth tables for preventing at least one appliance from a plurality of appliances from being switched on.

Yet another object of the present invention is to provide a system and method of energy supply distribution for prioritizing the order in which appliances or utilities are operated.

Another object of the present invention is to provide a system and method of energy supply distribution that will prevent interruption of an operating appliance upon turning off another appliance.

A further object of the present invention is to provide a system and method of energy supply distribution able to prioritize groups of appliances able to operate at a same time within the limits set by the capacity of the supply.

An even further object of the present invention is to provide a system and method of energy supply distribution that is simple and easy to use.

A still further object of the present invention is to provide a system and method of energy supply distribution that is economical in cost to manufacture.

Additional objects of the present invention will appear as the description proceeds.

The present invention overcomes the shortcomings of the prior art by providing a system and method of energy supply distribution utilizing pre-determined truth tables to prioritize and divide an operational supply among a plurality of units or appliances. The present invention further provides for general management of utilities such as combustible fuel, e.g., gas and oil, water, compressed air and heat to maintain balance between supply and demand.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 3:
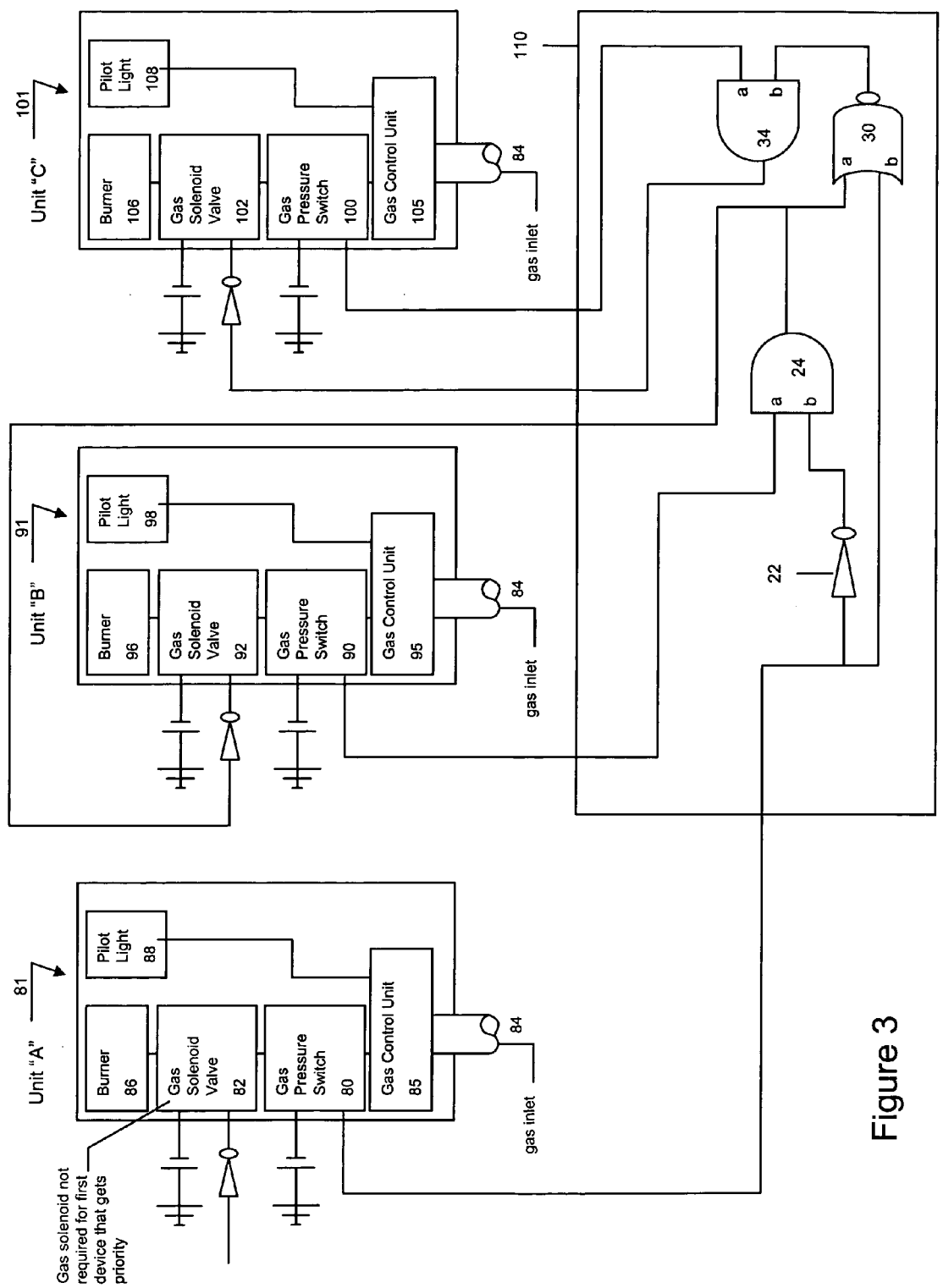
Figure 4B:
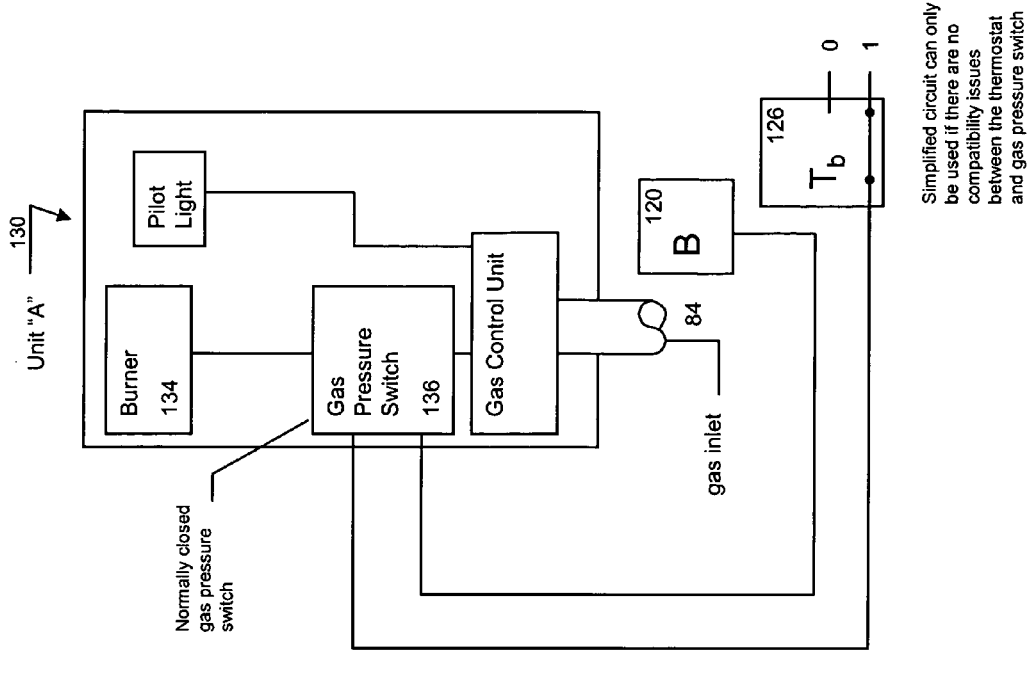
Figure 4A:
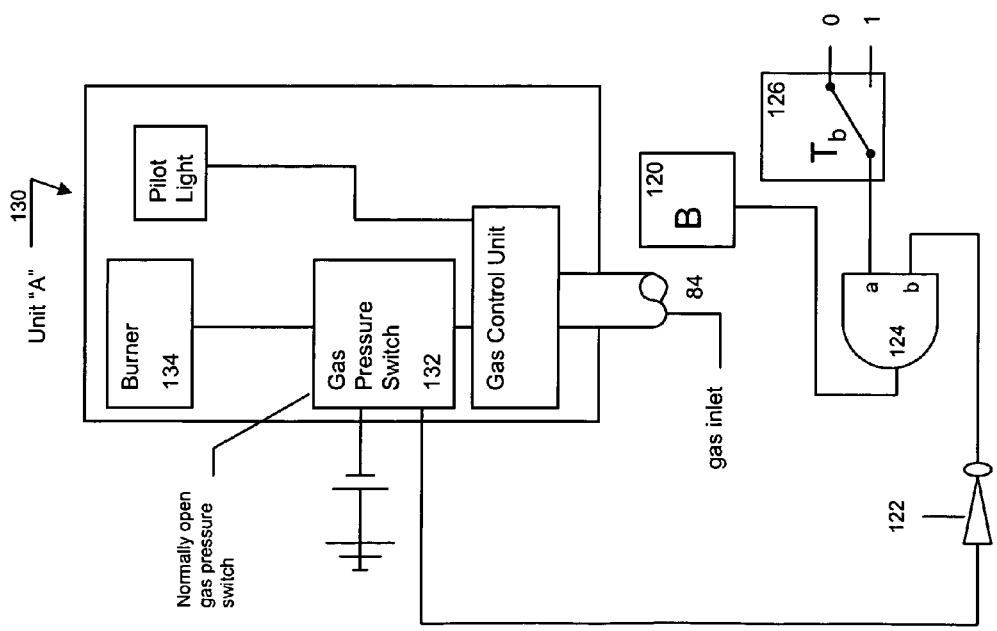
Figure 5:
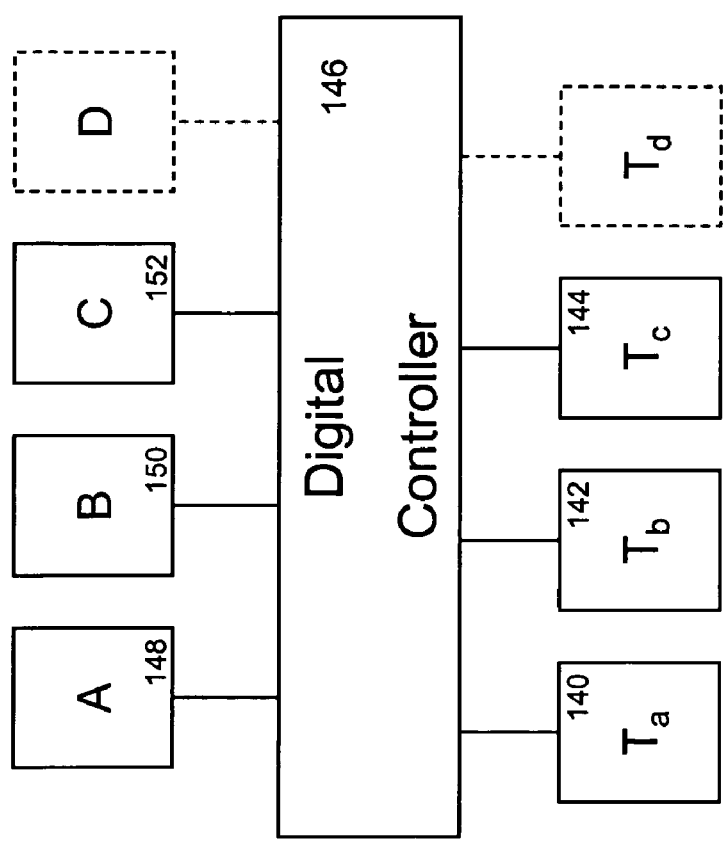

FIG. 3 is an electrical diagram illustrating an exemplary embodiment of the energy supply distribution system of the present invention, where a single unit or appliance of a plurality of units or appliances having no electrical interlock can receive the energy supply at a time; and FIG. 4a is an electrical diagram illustrating an exemplary embodiment of the energy supply distribution system of the present invention, where only one appliance of a plurality of appliances having an electrical interlock;

FIG. 4b is an electrical diagram illustrating an exemplary embodiment of the energy supply distribution system of the present invention having no electrical interlock where only one appliance of a plurality of appliances can receive the energy supply at a time with appliances having no electrical interlock receiving priority; and FIG. 5 is an electrical diagram showing the energy supply distribution system of the present invention configured to prevent interruption of operation of an appliance when another appliance is in the "ON" state.

DETAILED DESCRIPTION OF THE PREFERRED EMBODIMENT

Turning now descriptively to the drawings, in which similar reference characters denote similar elements throughout the several views, FIGS. 1 through 5 illustrate the energy supply distribution system and method of the present invention. The following discussion describes in detail exemplary embodiments of the invention. This discussion should not be construed, however, as limiting the invention to those particular embodiments, practitioners skilled in the art will recognize numerous other embodiments as well. For definition of the complete scope of the invention, the reader is directed to appended claims.

In one exemplary application for the present invention, a gas fired boiler and a gas fired instantaneous or tank-less hot water heater are considered. Assuming, for this example, the boiler consumes 125,000 Btu/hr of natural gas and the instantaneous hot water heater consumes 117,000 Btu/hr of natural gas. The two appliances used simultaneously would require 242,000 Btu/hr of natural gas. A one-inch diameter black pipe with 50 feet of length supplies only 215,000 Btu/hr. The service requirements, i.e., 242,000 Btu/hr are 27,000 Btu/hr higher than the 215,000 Btu/hr capacity of the existing system.

Installation of the 117,000 Btu/hr instantaneous hot water heater in a dwelling with a 50 foot one-inch black pipe main having a capacity of 215,000 Btu/hr and the pre-existing 125,000 Btu/hr boiler, will require increasing the size of the gas service and replacing the existing black pipe with 50' 1¼" diameter pipe. Additionally, the chimney flue pipe may also need to be increased as the diameter of the flue pipe may now be insufficient to carry the increased exhaust of the natural gas consuming appliances. The supply of fresh air for combustion within the boiler room may also need to be increased. As can be easily seen from this example, this solution, presently the only solution available, is costly.

It is, however, easily appreciated from the above-presented hypothetical that the instantaneous hot water heater will only be in use when there is a demand for hot water. The full utilization of the 242,000 Btu/hr capacity will only occur when there is simultaneous demand for heat and hot water. Because of the nature of appliances such as the gas fired boiler, which works for a short period of time and then shuts off, the probability of both the gas fired boiler and the instantaneous hot water heater consuming energy at the same time is low.

By not permitting simultaneous use of the boiler and hot water heater, e.g., the operation of the boiler is delayed during use of the instantaneous hot water heater, only a maximum 125,000 Btu/hr of natural gas service is required at any time. As the water heater is only operational for short periods of time, such as for showering, cooking, dishwashing and washing clothes, delaying operation of the boiler during use of the hot water heater will not affect the operation of the boiler. The lower demand for natural gas permits the use of a smaller existing boiler one-inch gas main, chimney flue pipe and fresh air intake. If the non-simultaneous supply distribution is widely accepted, the peak demand for natural gas on the communal utility grid will be dramatically lowered.

In another application, the invention is applied in the heating ventilating and air conditioning (HVAC) field. The inventive energy supply distribution may be utilized in conjunction with zone controllers. The inventive energy supply distribution permits selective use of rooms so as not to exceed the capacity of the installed air conditioning system. For example, where an exercise or a conference room is added to an office building or a private residence. Commonly, the use of the exercise or conference room is limited to times when other rooms are not used by the occupants or residents.

Presently, heating or cooling the additional space, such as conference or exercise rooms or any other additions to an existing structure having an installed HVAC unit of a fixed capacity, requires increasing the unit capacity of the HVAC. More often than not this leads to a costly additions or outright replacement of the HVAC unit with another unit having higher capacity. As an inevitable consequence, replacement of the HVAC unit affects ductwork, which would also need to be increased in size to accommodate higher airflow requirements. Usually, ductwork presents space and clearance problems.

Some measures short of replacing the HVAC unit can be taken, for example, use of a timer in conjunction with zone allocation of heat or air. However, this measure requires the use of rooms on a fixed schedule. This is not practical as conferences and most other life events are usually not held on a fixed schedule.

The present invention allows for the ductwork to be wired in groups or zones in a manner as to allow the ductwork to let air in the rooms of one group while shifting off air delivery to another group. In one example, an exercise room can be in the first group while bedrooms can be in a second group.

In an HVAC system using ductwork, the invention can be adapted by adding electrical circuitry to control dampers in the duct system. The circuitry will be described in detail below. Other systems including electrical appliances such as dish washers and clothes washers can be adopted through the use of such circuitry to prevent simultaneous use, and, as in this example, conserve water. Additionally, in systems such as hot water and steam heating, valves operated by the circuitry of the present invention can be installed to inhibit non-simultaneous heating.

The above examples of energy supply distribution are applicable to any utility or power supply, combustible fuel, pressurized gas or liquid, including but not limited to steam, water, oil, gas, natural gas, LP gas, electricity, compressed air and low pressure air flows.

Use of One Appliance at a Time

In one embodiment, the present invention is used with electrical appliances and non-electrical appliances having an electrical interlock. FIG. 1 is an electrical diagram illustrating the invention 10 applied with an interconnection of non-simultaneously used appliances or machinery 12–16. It is assumed for this embodiment that enough of the resource is being supplied to power anyone of the appliances 12–16. This embodiment allows for only one appliance or piece of machinery 12–16 to be used at a given time.

The logic diagram of the invention 10 shown in FIG. 1 is illustrated in a truth table given below. The truth table defines the required mode of operation. In the diagram 10, appliance 12 is given priority over appliances 14 and 16. Appliance 14 is given priority over appliance 16.

TABLE 1

| | Switch 18 | Switch 26 | Switch 32 | State of Appliance 12 | State of Appliance 14 | State of Appliance 16 |
|---|---|---|---|---|---|---|
| 1 | 1 - ON | 0 - OFF | 0 - OFF | 1 - ON | 0 - OFF | 0 - OFF |
| 2 | 0 - OFF | 1 - ON | 0 - OFF | 0 - OFF | 1 - ON | 0 - OFF |
| 3 | 0 - OFF | 0 - OFF | 1 - ON | 0 - OFF | 0 - OFF | 1 - ON |
| 4 | 0 - OFF | 0 - OFF | 0 - OFF | 0 - OFF | 0 - OFF | 0 - OFF |
| 5 | 1 - ON | 1 - ON | 1 - ON | 1 - ON | 0 - OFF | 0 - OFF |
| 6 | 1 - ON | 1 - ON | 0 - OFF | 1 - ON | 0 - OFF | 0 - OFF |
| 7 | 0 - OFF | 1 - ON | 1 - ON | 0 - OFF | 1 - ON | 0 - OFF |
| 8 | 1 - ON | 0 - OFF | 1 - ON | 1 - ON | 0 - OFF | 0 - OFF |

Three situations exemplified by values listed in rows 1, 5 and 7 of Table 1 will now be described with reference to the electrical diagram illustrated in FIG. 1. The situations listed in other rows of Table 1 operate in the same manner as discussed below with respect to rows 1, 5 and 7. These rows are described for example only and not meant to limit the application to the instances described.

Table 1, Row 1

Figure 1A:
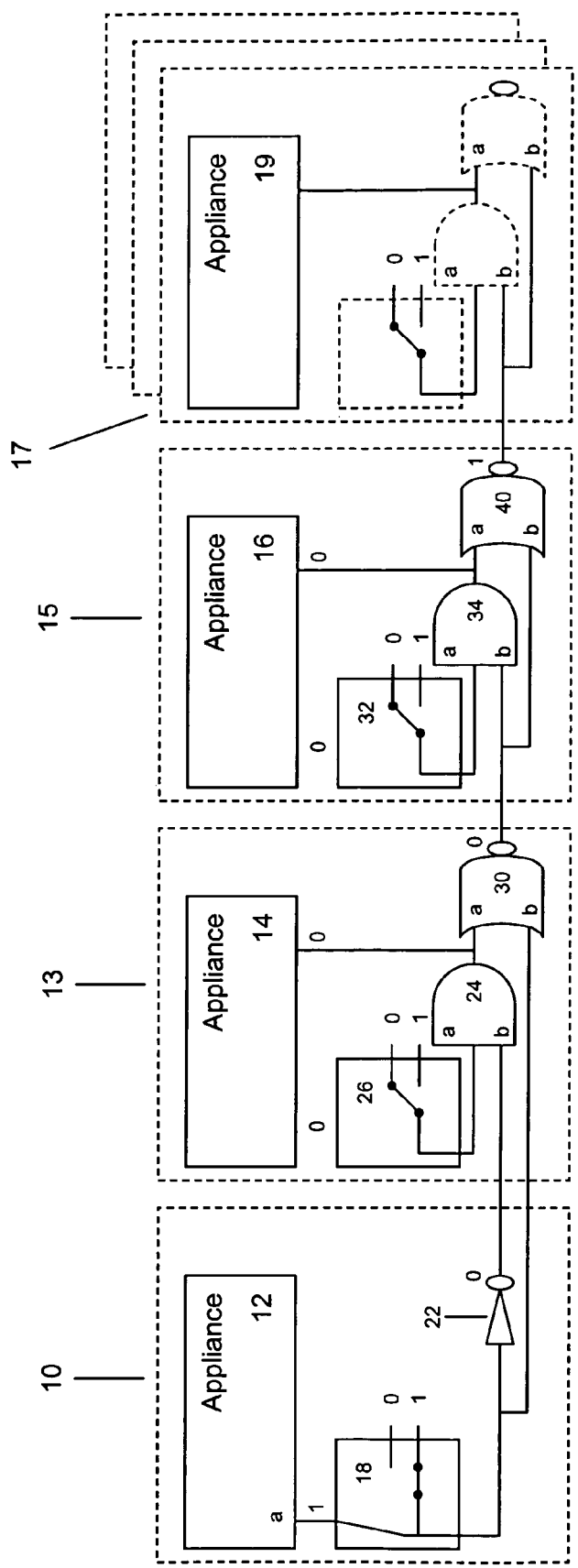
FIG. 1a is an electrical diagram illustrating an exemplary embodiment of the energy supply distribution system of the present invention, in which a single unit or appliance of units or a plurality of appliances can receive the energy supply in accordance with a predetermined priority, in this Figure, one appliance requests and receives the energy supply.

FIG. 1a illustrates the state of appliances 12–16 as values listed in row 1 of Table 1. A signal indicative of the state of each appliance is applied by a respective one of switch 18, 26 and 32. As can be seen from the Figure, the switch 18 of appliance 12 is switched to the "ON" position and thus appliance 12 is turned on. The switch provides an "ON" signal having logic level "1" to appliance 12 and to an input terminal of a NOT gate 22. The signal is also provided to a terminal B of a NOR gate 30 of a control logic block for appliance 14. The NOT gate 22 produces and sends an output signal having logic level "0" to a terminal B of an AND gate 24 in the control logic block for appliance 14.

The switch 26 of the control logic block for appliance 14 is switched to the "OFF" position and appliance 14 is turned off. The switch 26 provides an "OFF" signal having logic level "0" to appliance 14 and a terminal A of the AND gate 24. The AND gate 24 sends a signal having logic level "0" to a terminal A of the NOR gate 30. The NOR gate 30 sends a signal having logic level "0" to a control logic block for appliance 16. The signal "0" from the NOR gate 30 is received by a terminal B of an AND gate 34 and a terminal B of a NOR gate 40.

The switch 32 of the appliance 16 is switched to the "OFF" position and appliance 16 is turned off. The switch 32 provides an "OFF" signal having logic level "0" to a terminal A of the AND gate 34. The AND gate 34 sends a signal having logic level "0" to a terminal A of the NOR gate 40. The AND gate 34 also sends a signal having logic level "0" to the appliance 16 maintaining appliance C in the "OFF" state. Upon receipt of the "OFF" signal "0" appliance 16 either maintains or switches switch 32 to the "OFF" state.

In configurations including additional appliances, the NOR gate 40 may send the resulting signal, here "1", to a control logic block for the next appliance.

Table 1, Row 5

Figure 1B:
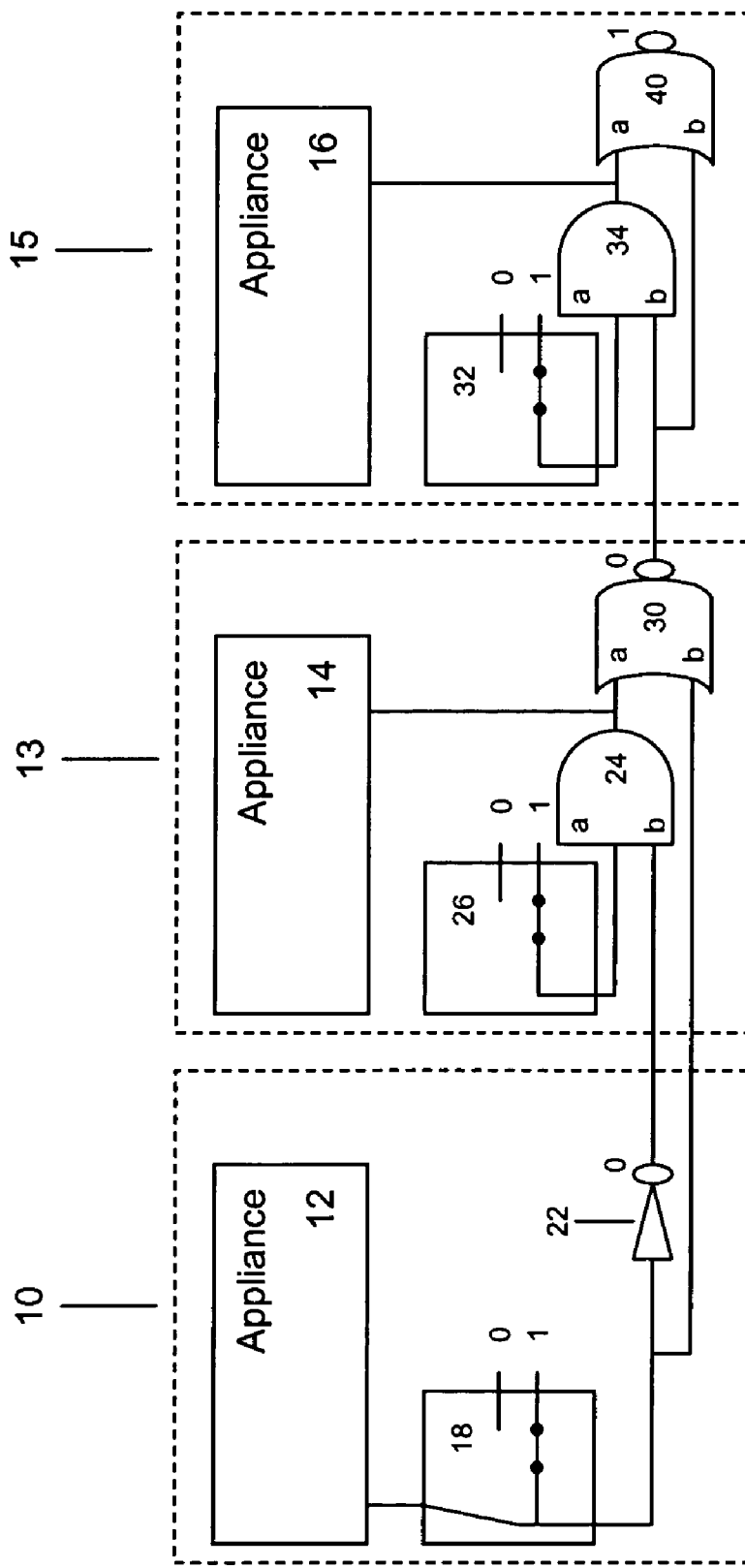
FIG. 1b is an electrical diagram illustrating an exemplary embodiment of the energy supply distribution system of the present invention, in which a single unit or appliance of units or plurality of appliances can receive the energy supply in accordance with a predetermined priority, in this Figure, all appliances request but only one receives the energy supply.

FIG. 1b illustrates the state of appliances 12–16 as values listed in row 5 of Table 1. A signal indicative of the state of each appliance is applied to switches 18, 26, and 32. As can be seen from the figure, when the switch 18 of appliance 12 is switched to the "ON" position, appliance 12 is turned on. An "ON" signal "1" is sent by switch 18 to appliance 12, to terminal B of a NOR gate 30 of the control logic block for appliance 14 and to a NOT gate 22 which sends an output signal "0" to terminal B of an AND gate 24.

Appliance 14 is in the off state, however, the switch 26 of the control logic block for appliance 14 is switched to the "ON" position. The switch 26 sends an "ON" signal "1" to terminal A of the AND gate 24. The AND gate 24 sends a signal "0" to a terminal A of the NOR gate 30 and to appliance 14. The signal "0" sent by AND gate 22 indicates the "OFF" state to the appliance 14. Upon receipt of the "OFF" signal "0" appliance 14 either maintains or switches to the "OFF" state. As the switch 26 is in the "ON" position, when the state of appliance 12 is changed to the "OFF" state, appliance 14 will be ready to turn to the "ON" state. The NOR gate 30 produces and sends a signal "0" to the control logic block for appliance 16. The signal "0" from the NOR gate 30 is received by a terminal B of AND gate 34 and terminal B of NOR gate 40 in the control logic block for appliance 16.

Although appliance 16 is in the OFF state, the switch 32 of the appliance 16 is in the "ON" position, generating and sending an "ON" signal "1" to a terminal A of the AND gate 34. The AND gate 34 sends a signal "0" to a terminal A of the NOR gate 40 and to appliance 16. The signal "0" sent by AND gate 34 indicates the "OFF" state to the appliance 16 thereby causing appliance 16 to remain in the "OFF" state. As the switch 32 is in the "ON" position, when the state of appliance 12 is changed to the "OFF" state, appliance 16 will be ready to turn to the "ON" state as long as appliance 14 remains in the "OFF" state. Upon receipt of the "OFF" signal "0" appliance 16 either maintains or switches to the "OFF" state.

In configurations including additional appliances, the NOR gate 40 may send the resulting signal, here "1", to a control logic block for the next appliance.

Table 1, Row 7

Figure 1C:
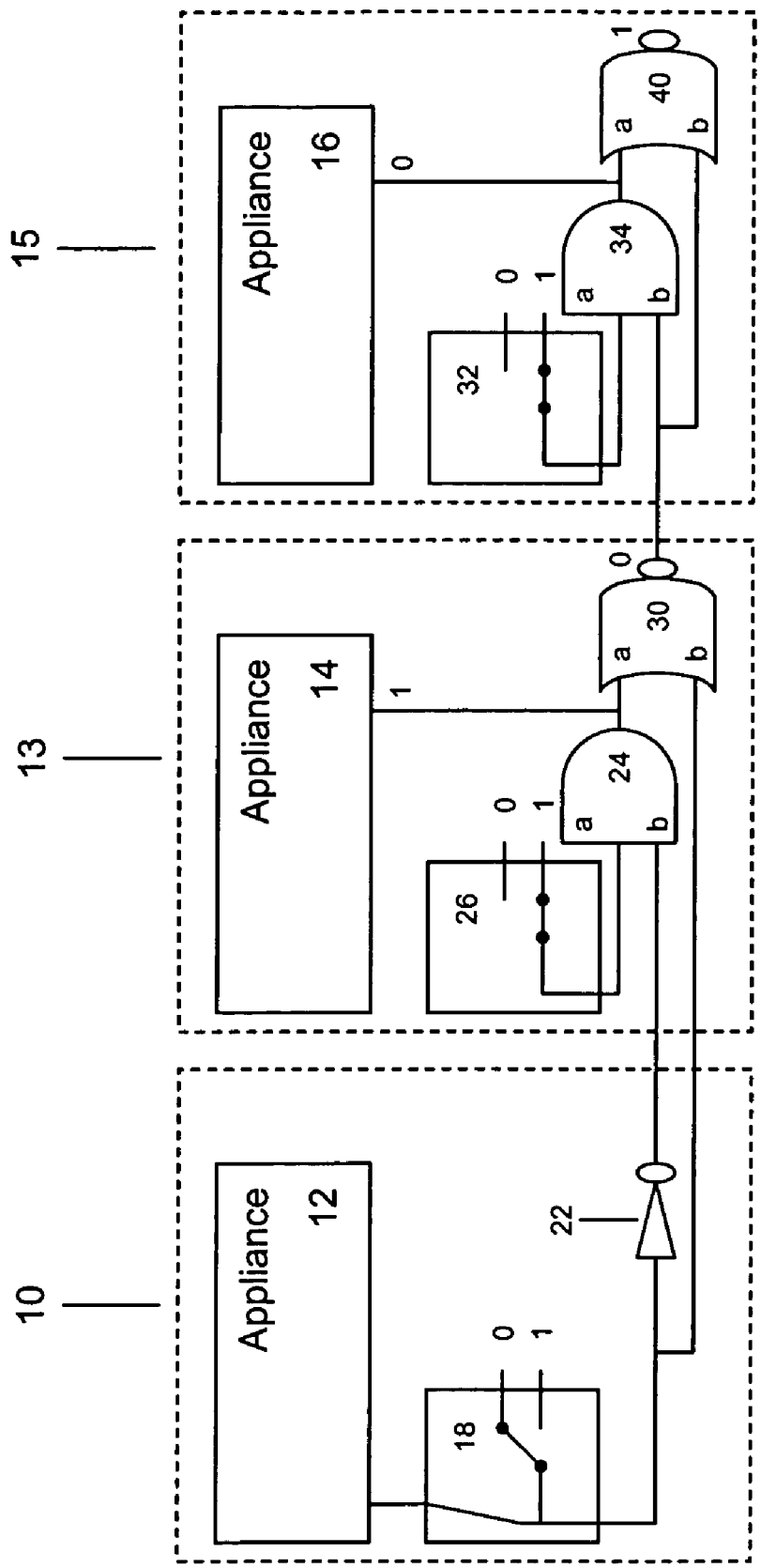
FIG. 1c is an electrical diagram illustrating an exemplary embodiment of the energy supply distribution system of the present invention, in which a single unit or appliance of units or plurality of appliances can receive the energy supply in accordance with a predetermined priority, in this Figure, two appliances request but only one receives the energy supply.

FIG. 1c illustrates the state of appliances 12–16 as values listed in row 7 of Table 1 wherein appliance 14 is turned on. A signal indicative of the state of each appliance is applied to switches 18, 26 and 32. As can be seen form the Figure, the switch 18 of appliance 12 is switched to the "OFF" position, generating and sending an "OFF" signal "0" to appliance 12, to terminal B of NOR gate 30 of the control logic block for appliance 14 and to NOT gate 22 for providing an output signal "1" to terminal B of an AND gate 24.

The switch 26 of the control logic block for appliance 14 is switched to the "ON" position. Thus switch 26 sends an "ON" signal "1" to terminal A of the AND gate 24. The AND gate 24 produces and sends a signal "1" to a terminal A of the NOR gate 30 and to appliance 14 causing appliance 14 to turn on or remain in the ON state. The NOR gate 30 produces and sends a signal "0" to a control logic block for appliance 16. The signal "0" from the NOR gate 30 is received by terminal B of AND gate 34 and terminal B of NOR gate 40.

Although appliance 16 is in the OFF state, the switch 32 of appliance 16 is in the "ON" position, generating and sending an "ON" signal "1" to a terminal A of the AND gate 34. The AND gate 34 sends a signal "0" to terminal A of the NOR gate 40 and to appliance 16. Upon receipt of the "OFF" signal "0" appliance 16 either maintains or switches to the "OFF" state. As the switch 32 is in the "ON" position, when the state of appliance 14 is changed to the "OFF" state, appliance 16 will be ready to turn to the "ON" state as long as appliance 12 remains in the "OFF" state.

In configurations including additional appliances, the NOR gate 40 may send the resulting signal, here "1", to a control logic block for the next appliance. The circuitry of the control logic block for each additional appliance is the same as that shown for the control logic blocks 13 and 15, therefore control logic block 17 and corresponding appliances 19 may be expanded infinitely.

Two Appliances at a Time

In another application in which enough of a supply is provided for operating more than one appliance or piece of machinery, the invention is used with electrical appliances or any appliance having an electrical interlock, where more than one device are able to be used at a time. FIG. 2 is an electrical diagram illustrating the inventive non-simultaneous use devices interconnection 50 of appliances 52, 54 and 56. It is assumed for this embodiment that enough of the resource is being supplied to power more than one of the appliances 52, 54 and 56.

In the present example, three appliances 52, 54 and 56 are installed with the possibility of using more than one appliance at a given time. In this example, a combination of appliances 52 and 54 is given priority over a combination of appliances 54 and 56 or a combination of appliances 52 and 56. The truth Table 2 corresponds to the circuit illustrated in FIG. 2 and defines the required mode of operation of the circuit 50.

TABLE 2

|   | Switch A | Switch B | Switch C | State of Appliance 52 | State of Appliance 54 | State of Appliance 56 |
| --- | --- | --- | --- | --- | --- | --- |
| 1 | 1 - ON | 0 - OFF | 0 - OFF | 1 - ON | 0 - OFF | 0 - OFF |
| 2 | 0 - OFF | 1 - ON | 0 - OFF | 0 - OFF | 1 - ON | 0 - OFF |
| 3 | 0 - OFF | 0 - OFF | 1 - ON | 0 - OFF | 0 - OFF | 1 - ON |
| 4 | 0 - OFF | 0 - OFF | 0 - OFF | 0 - OFF | 0 - OFF | 0 - OFF |
| 5 | 1 - ON | 1 - ON | 1 - ON | 1 - ON | 1 - ON | 0 - OFF |
| 6 | 1 - ON | 1 - ON | 0 - OFF | 1 - ON | 1 - ON | 0 - OFF |
| 7 | 0 - OFF | 1 - ON | 1 - ON | 0 - OFF | 1 - ON | 1 - ON |
| 8 | 1 - ON | 0 - OFF | 1 - ON | 1 - ON | 0 - OFF | 1 - ON |

Table 2, Row 1

Figure 2A:
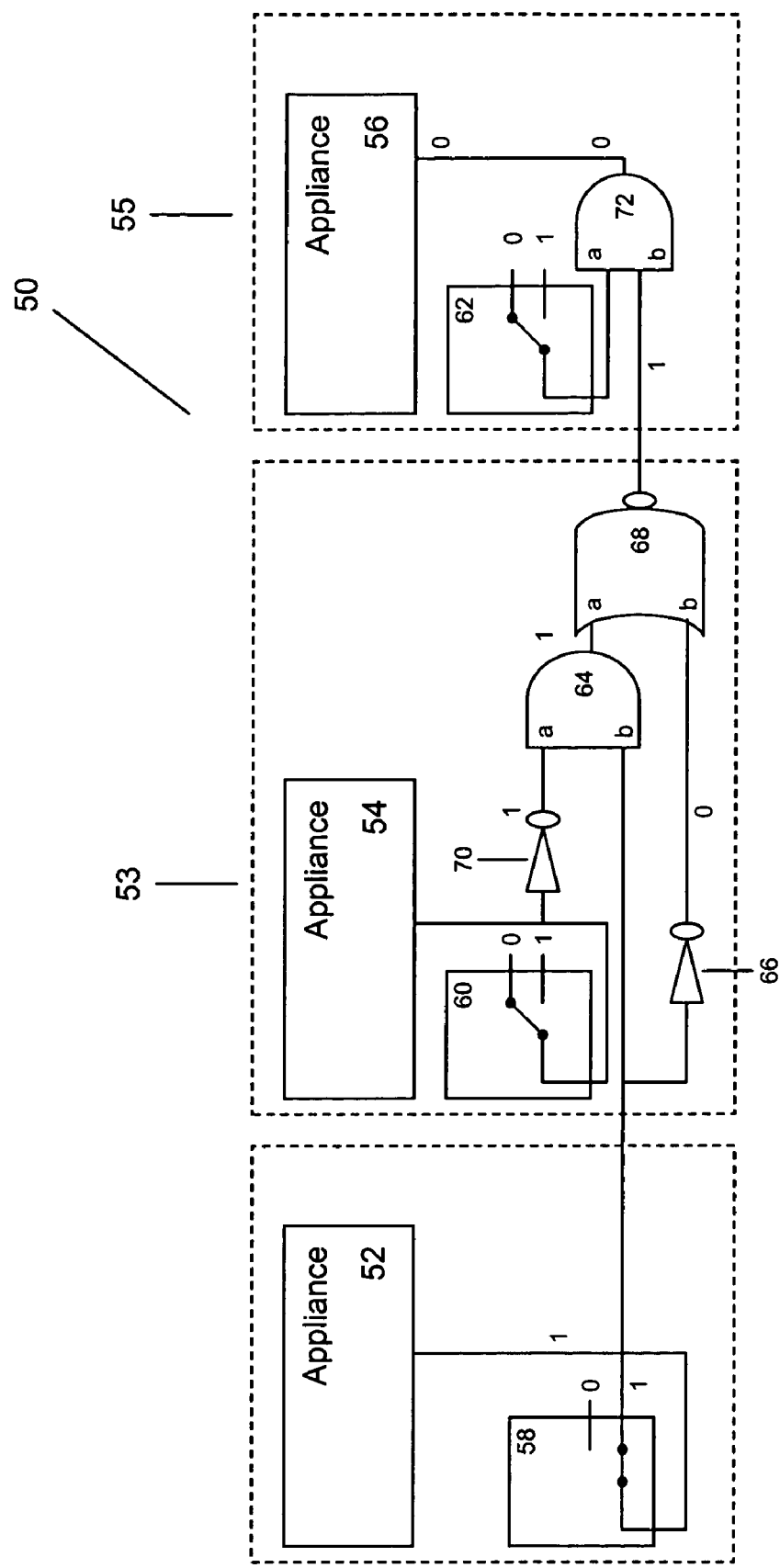
FIG. 2a is an electrical diagram illustrating an exemplary embodiment of the energy supply distribution system of the present invention, in which at least two units or appliances of a plurality of units, or appliances can receive the energy supply, in this Figure, one appliance requests and receives the energy supply.

FIG. 2a illustrates the state of appliances 52, 54 and 56 and the position of their corresponding switches in accordance with the values listed in row 1 of Table 2. As can be seen from Row 1 of Table 2, appliance 52 is in the "ON" state and the corresponding switch 58 for appliance 52 is switched to the "ON" position providing an "ON" signal having a logic level of "1" to the appliance 52, a terminal B of an AND gate 64 of a control logic block 53 for appliance 54 and to a NOT gate 66 for producing and sending an output signal "0" to a terminal B of an OR gate 68.

The switch 60 of the control logic block 53 for appliance 54 is switched to the "OFF" position providing an "OFF" signal having a logic level of "0" indicating the "OFF" state to the appliance 54 and to a NOT gate 70. The NOT gate 70 provides an output signal "1" to terminal A of the AND gate 64. The AND gate 64 receives the output signal "1" from the NOT gate 70 and the output "1" from the switch 58 and provides a signal "1" to a terminal A of OR gate 68. The OR gate 68 receives the output signal "1" from the AND gate 64 and the output "0" from the NOT gate 66 and provides a signal "1" to a control logic block 55 for appliance 56. The signal "1" from OR gate 68 is received by a terminal B of an AND gate 72 of control circuitry for appliance 56.

The switch 62 of the appliance 56 is switched to the "OFF" position and provides an "OFF" signal having a logic level of "0" to a terminal A of the AND gate 72. The AND gate 72 receives the output signal "1" from the NOR gate 68 and the output "0" from the switch 62 and provides a signal "0" to the appliance 56. Upon receipt of the "OFF" signal "0" appliance 56 either maintains or switches to the "OFF" state.

This concept described above in connection with the diagram 50 illustrated in FIG. 2 can be applied to configurations including additional appliances, where two or more appliances are given priority over any other two or more appliances to be used at the same time.

Table 2, Row 5

Figure 2B:
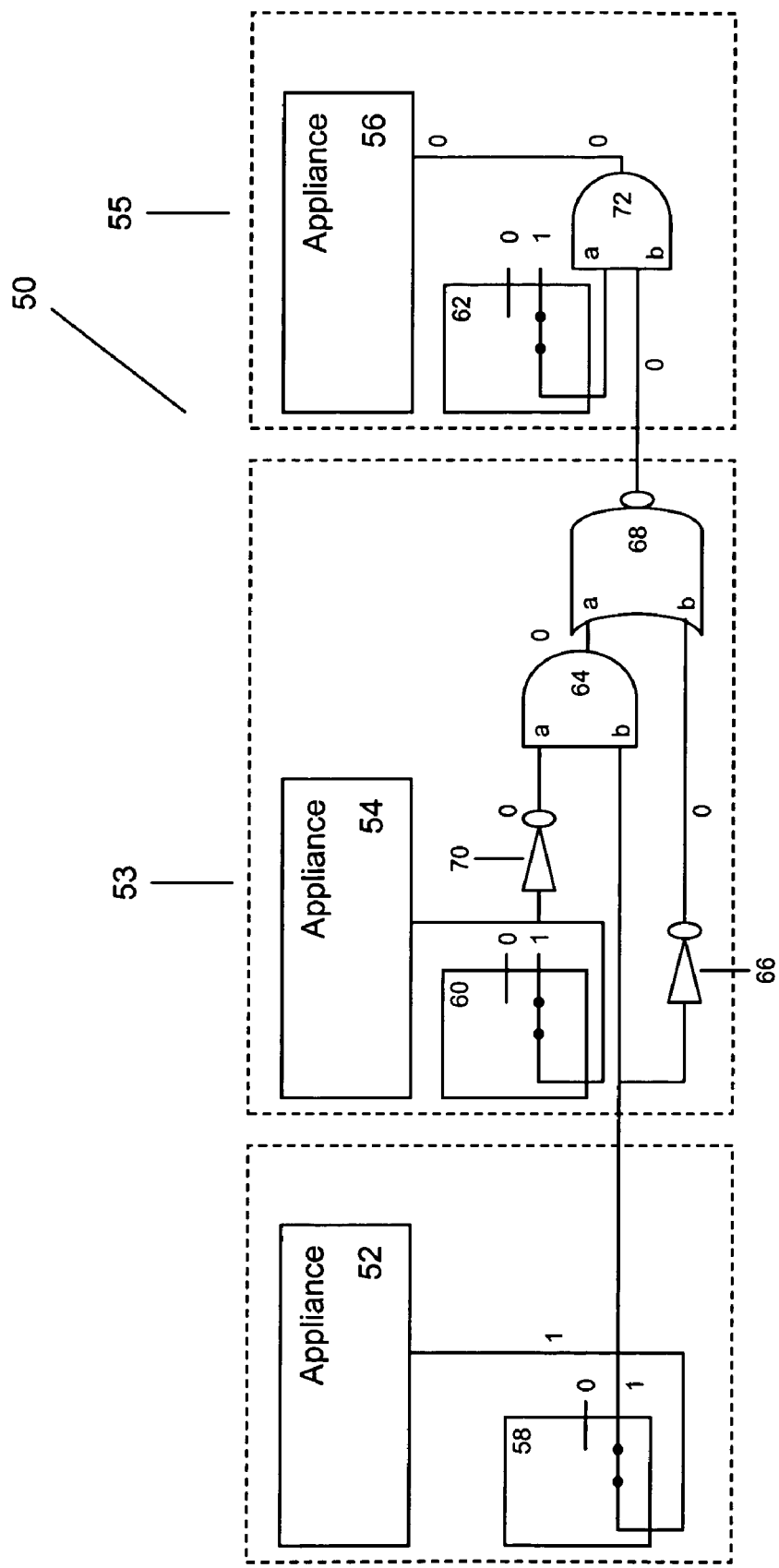
FIG. 2b is an electrical diagram illustrating an exemplary embodiment of the energy supply distribution system of the present invention, in which at least two units or appliances of a plurality of units, or appliances can receive the energy supply, in this Figure, three appliances request and two receive the energy supply.

FIG. 2b illustrates the state of appliances 52, 54 and 56 in accordance with the values listed in row 5 of Table 2. As the switch 58 of appliance 52 is switched to the "ON" position appliance 52 is "ON". Switch 58 provides an "ON" signal "1" to the appliance 52, to terminal B of AND gate 64 of control logic block 53 for appliance 54 and to NOT gate 66 for producing and sending an output signal "0" to terminal B of OR gate 68.

The switch 60 of the control logic block 53 for appliance 54 is switched to the "ON" position, sending an "ON" signal "1" indicating the "ON" state to the appliance 54 and to NOT gate 70 for sending an output signal "0" to terminal A of the AND gate 64. Upon receipt of the "ON" signal "1" appliance 54 maintains or switches to the "ON" state. The AND gate 64 receives the output signal "0" from the NOT gate 70 and the output "1" from the switch 58 and provides a signal "0" to terminal A of the OR gate 68. The OR gate 68 receives the output signal "0" from the NOT gate 70 and the output "1" from the AND gate 64 and provides a signal "0" to control logic block 55 for appliance 56. The signal "0" from the OR gate 68 is received by terminal B of an AND gate 72.

The switch 62 of appliance 56 is switched to the "ON" position, sending an "ON" signal "1" to terminal A of AND gate 72. The AND gate 72 receives the output signal "0" from the NOR gate 68 and the output "1" from the switch 58 and provides a signal "0" indicating the "OFF" state to the appliance 56. Upon receipt of the "OFF" signal "0" appliance 56 either maintains or switches to the "OFF" state.

This concept described above in connection with the diagram 50 illustrated in FIG. 2 can be applied to configurations including additional appliances, where two or more appliances are given priority over any other two or more appliances to be used at the same time.

Table 2, Row 7

Figure 2C:
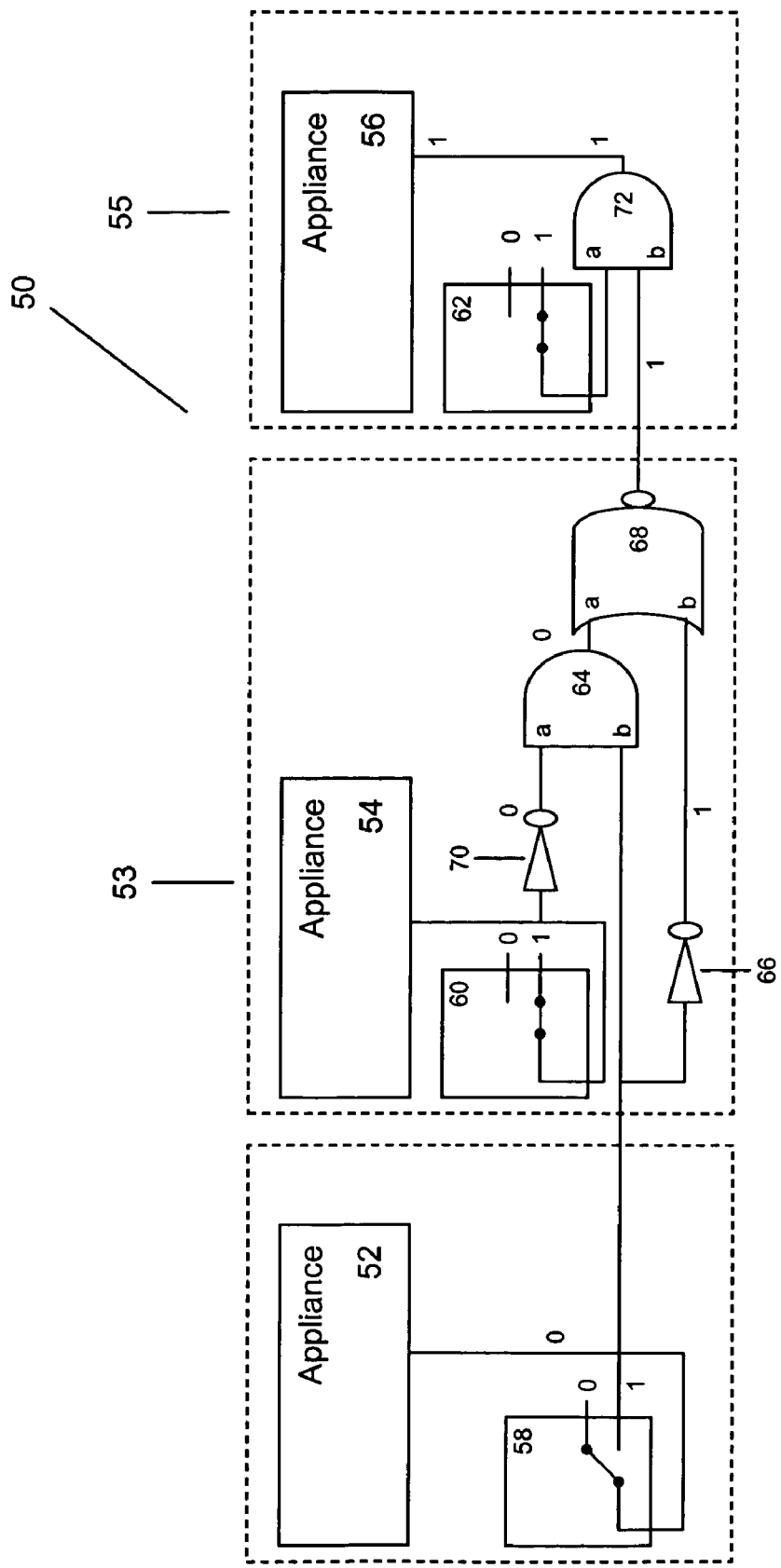
FIG. 2c is an electrical diagram illustrating an exemplary embodiment of the energy supply distribution system of the present invention, in which at least two units or appliances of a plurality of units, or appliances can receive the energy supply, in this Figure, two appliances request and receive the energy supply.

FIG. 2c illustrates the state of appliances 52, 54 and 56 in accordance with the values listed in row 7 of Table 2. The switch 58 of appliance 52 is switched to the "OFF" position, generating and sending an "OFF" signal "0" to the appliance 52, to terminal B of AND gate 64 of control logic block 53 for appliance 54 and to NOT gate 66 for producing and sending an output signal "0" to terminal B of OR gate 68.

The switch 60 of the control logic block 53 for appliance 54 is switched to the "ON" position, sending an "ON" signal having a logic level of "1" indicating the "ON" state to the appliance 54 and to NOT gate 70 for providing an output signal "0" a to terminal A of the AND gate 64. Upon receipt of the "ON" signal "1" appliance 54 maintains or switches to the "ON" state. AND gate 64 receives the output signal "0" from the NOT gate 70 and the output "1" from the switch 58 and provides a signal "0" to a terminal A of the OR gate 68. The OR gate 68 provides a signal having logic level "0" to control logic block 55 for appliance 56. The signal "0" from the OR gate 68 is received by terminal B of AND gate 72.

As the switch 62 of the appliance 56 is switched to the "ON" position, an "ON" signal "1" is provided to terminal A of the AND gate 72. The AND gate 72 provides a signal "1" indicating the "ON" state to the appliance 56. Upon receipt of the "ON" signal "1" appliance 56 either keeps or switches to the "ON" state.

This concept described above in connection with the diagram 50 illustrated in FIG. 2 can be applied to configurations including additional appliances, where two or more appliances are given priority over any other two or more appliances to be used at the same time.

One Appliance at a Time—No Electrical Interlock

FIG. 3 illustrates the present invention used with any pilot or pilot-less appliance or machine powered by any combustible fuel, pressurized gas or liquid with no electrical interlock. Water heaters or compressed air devices generally do not have electrical interlocks. To allow energy supply distribution to such devices, in a manner as to provide for non-simultaneous use of these devices, requires the addition of electrical interlocks. Electrical interlocks enable devices such as water heaters or compressed air devices to be used in a manner described above for appliances with electrical interlocks with reference to FIGS. 1 and 2.

FIG. 3 shows a first appliance 81, a second appliance 91 and a third appliance 101. The first appliance 81 includes a gas pressure switch 80, a solenoid valve 82, a burner 86 and a gas control unit 85. The second appliance 91 includes a gas pressure switch 90, a solenoid valve 92, a burner 96 and a gas control unit 95. The third appliance 101 includes a gas pressure switch 100, a solenoid valve 102, a burner 106 and a gas control unit 105. The first, second and third appliances 81, 91 and 101, respectively, are each tied into a supply of gas or other energy source 84 for supplying the respective burner 86, 96, 106 under the control of the respective a gas control unit 85, 95, 105. The gas solenoid valve 82, 92, 102 serves as an electrical interlock to shut down the flow of gas 84, 94 104 at the respective burner 86, 96 106 but permits operation of a respective pilot light 88, 98 and 108. The gas pressure switch 80, 90, 100 is used as an electrical interlock to determine when use of a particular device 81, 91, 101 is demanded. Since the solenoid valve 82, 92, 102 is used to shut off an appliance 81, 91, 101, any device requiring priority operation will not require a solenoid valve.

The gas solenoid valve 82, 92, 102 must be placed upstream of the gas pressure switch 80. Placing the solenoid valve 82, 92, 102 upstream assures the signal calling for use of the appliance is constant when the solenoid valve 82, 92, 102 shuts off flow of the supply 84, 94, 104 to the machine or appliance 86, 96, 106.

The use of a gas pressure switch 80, 90, 100 and a gas solenoid valve 82, 92, 102 in conjunction with the circuitry for the electrical interlock 110 illustrated in FIG. 3 is purposes of example only and not meant to limit the scope of the present invention. The present invention may be expanded to control supply flow and operation of an infinite number of appliances 81, 91 and 101 and any combination of multiple devices. The electrical interlock circuitry 110 illustrated in FIG. 3 is depicted and described in detail with reference to FIG. 1.

One Appliance without Electrical Interlock One Appliance With Electrical Interlock FIG. 4a illustrates another embodiment of the present invention used within a combination of one device without an electrical interlock. FIG. 4b illustrates another embodiment of the present invention used within a combination of one device with an electrical interlock. It is assumed, for the purposes of this example that the device without the electrical interlock requires priority and must be constantly provided with an operational supply. FIG. 4 illustrates both use of a normally open gas pressure switch 132 and a normally closed gas pressure switch 136. With the normally closed gas pressure switch 136, no additional logic circuitry is needed to properly provide operating power to either device. Such a circuit may only be used if no compatibility issues exist between the two devices.

In the embodiment illustrated in FIG. 4a, a boiler or heater 120 is connected to a thermostat 126 and a hot water heater or instant hot water heater 130. A boiler 120 generally calls for heat when the thermostat 126 falls below a predetermined value, thereby triggering a demand for heat. An input of logic level "1" to the thermostat 126 indicates an "ON" state for the boiler. An input of logic level "0" to the thermostat 126 indicates an "OFF" state for the boiler. The input to the thermostat indicates the temperature level measured by the thermostat 126. If the temperature is below a threshold value, the input to the thermostat is logic level "1". If the temperature is above a threshold value, the input to the thermostat is logic level "0". This logic level is provided to an input of an AND gate 124. An instant hot water heater 130 provides a second input to the AND gate 124 via the gas pressure switch 132 and a NOT gate 122. The AND gate 124 provides an input to the boiler 120 dependent upon the state of the switch 126 and the inverse state of the gas pressure switch 132.

The current flow of the gas pressure switch 132 is wired to the thermostat of the boiler or heater 120, such that the gas pressure switch 132 will interrupt the thermostat during use of the water heater. In the present example an "ON" signal sent by the pressure switch 132 is converted to an "OFF" signal by the NOT gate 122 and forwarded to a terminal B of an AND gate 124. When the boiler switch 126 is switched "ON", an "ON" signal is sent to a terminal A of the AND gate 124.

The "ON" signal from the gas pressure switch 132, indicating that hot water heater 130 is "ON" forces the AND gate 124 to generate an "OFF" signal, which will disable the operation of the boiler or heater 120. The use of a relay or equivalent device may be required to prevent drawing power from the thermostat, or to make the current rating of the thermostat and gas pressure switch compatible. Since only the water heater 130 can interrupt the boiler 120 the water heater is said to have priority over the boiler.

An instant hot water heater 130 is operational only during a period of demand for hot water. In the situations of domestic hot water use, such as, use of a shower, dishwasher, laundry machine, etc., hot water demand lasts for a period of approximately 20 minutes. During these times, when the hot water heater 130 is operating, operation of the boiler 120 for heat generation may be delayed. As this delay during periods of demand for hot water are short, the delay does not significantly effect the space heating performed by the boiler 120.

A hot water heater 130 generally has no electrical interlock as is shown in FIG. 4b. A gas pressure switch 136 is installed at the gas pipe feeding the burner for the hot water heater 130. The gas pressure switch 132 is used as an electrical device to sense when the hot water heater 130 is in operation. A normally closed gas pressure switch 132 will allow current to flow through the switch 132 when there is no gas pressure at the burner 134 indicating the unit is not running. The flow of current is provided to the boiler 120 and to the thermostat 126. The thermostat 126 is also connected to provide an input to the boiler 120. This circuit is used if no compatibility issues exist between the thermostat 126 and the gas pressure switch 136 and thus the boiler and hot water heater are able to each operate independently without any overlap.

Prevention of Interruption of the Poeration of an Appliance

FIG. 5 illustrates an embodiment which will prevent supply from being diverted from an appliance when the appliance is operating. As can be seen from this figure, a first switch 140 for controlling a first appliance 148, a second switch 142 for controlling a second appliance 150 and a third switch 144 for controlling a third appliance 152 are all connected to inputs of a processor 146. The first appliance 148, second appliance 150 and third appliance 152 are all connected to outputs of the processor 146. The processor 146 receives input signals from the first, second and third switches 140, 142 and 144 indicating whether it is desired to turn on a respective one of the first, second and third appliances 148, 150 and 152. If a signal indicating it is desired to turn on an appliance from one of the first, second and third switches 140, 142 and 144 and no other appliance is operating at the time the signal is received, the respective appliance is allowed to turn on. If another appliance is operating, the processor 146 will prevent interruption of the operation of the operating appliance. If a supply provided is large enough to support operation of both appliances simultaneously, the other appliance will be allowed to turn on. If the supply is not enough to support operation of both appliances, the other appliance is prevented from operating until the operating appliance is turned off.

The appliances connected to the processor 146 may also be prioritized. This prioritization of appliances is useful when more than one appliance requests the operating supply at the same time, i.e. more than one appliance is turned on at the same time. In such an instance, the appliance with the highest priority will be provided with the operating supply and allowed to turn on. Any other appliance requesting the operating supply will have to wait until the highest priority appliance turns off. The appliances will then be turned on in order of priority.

The operating states of the appliances is shown in Table 3 below.

TABLE 3

| | Switch 140 | Switch 142 | Switch 144 | State of Appliance 148 | State of Appliance 150 | State of Appliance 152 |
|---|---|---|---|---|---|---|
| 1 | 1 - ON | 0 - OFF | 0 - OFF | 1 - ON | 0 - OFF | 0 - OFF |
| 2 | 0 - OFF | 1 - ON | 0 - OFF | 0 - OFF | 1 - ON | 0 - OFF |
| 3 | 0 - OFF | 0 - OFF | 1 - ON | 0 - OFF | 0 - OFF | 1 - ON |
| 4 | 0 - OFF | 0 - OFF | 0 - OFF | 0 - OFF | 0 - OFF | 0 - OFF |
| 5 | 1 - ON | 1 - ON | 1 - ON | Prior State | Prior State | Prior State |
| 6 | 1 - ON | 1 - ON | 0 - OFF | Prior State | Prior State | Prior State |
| 7 | 0 - OFF | 1 - ON | 1 - ON | Prior State | Prior State | Prior State |
| 8 | 1 - ON | 0 - OFF | 1 - ON | Prior State | Prior State | Prior State |

As can be seen from rows 1–3 of Table 3, when an ON signal is sent by only one of the first, second and third switches 140, 142 and 144 to the processor 146, the processor 146 allows the respective appliance to be turned "ON". If an OFF signal is sent by all three of the first, second and third switches 140, 142 and 144, to the processor 146, all three appliances remain in the OFF state as depicted in Row 4. As depicted in Rows 5–8, when more than one of the first, second and third switches 140, 142 and 144 sends an ON signal to the processor 146, the processor 146 provides the appliance associated with the first of the first, second and third switches 140, 142 and 144 to send an "ON" signal with an operating supply. The state of the appliances prior to receipt of the "ON" signal from the second of the first, second and third switches 140, 142 and 144 is maintained until the currently operational appliance is turned "OFF".

The appliances connected to the processor 146 may also be prioritized. The prioritization of appliances is useful when more than one appliance requests the operating supply at the same time, i.e. more than one appliance is turned on at the same time. If no appliance is operating in the ON state and more than one appliance requests operating supply for turning on, the appliance with the highest priority will be provided with the operating supply and allowed to turn on. Any other appliance requesting the operating supply will have to wait until the highest priority appliance turns off. The appliances will then be turned on in order of priority.

The depiction of this embodiment with three switches and appliances connected to the processor is for purposes of example only. In practice, any number of switches and corresponding appliances desired can be connected to and controlled by the processor. Furthermore, this embodiment is not limited to use with a processor. In practice, any device able to receive and analyze operational state data received from switches and control operation of corresponding appliances may be used.

The present application illustrates operation of the present invention using logic gates. This is not meant to be limiting on the scope of the present invention. In practice any device able to simulate or perform the operation described with respect to the logic gates or relays may be used.

From the above description it can be seen that the energy supply distribution of the present invention is able to overcome the shortcomings of prior art by providing an energy supply distribution utilizing pre-determined truth tables to prevent at least one appliance from a plurality of appliances from being switched on.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for distributing an operating supply to a plurality of appliances, each appliance being provided with a predetermined priority, the predetermined priority for use of an appliance being determined with respect to each of the plurality of appliances independent of amount of supply required to operate each of the plurality of appliances, the apparatus comprising:

a plurality of sensors, each sensor being connected to a respective one of the plurality of appliances for sensing an operating state of the respective appliance; and means for selectively connecting the plurality of appliances together and to the operating supply based upon the predetermined priority and operating state of each appliance, wherein said apparatus distributes an operating supply to one of said plurality of appliances determined to be in an ON state and having a higher priority than any other of the plurality of appliances and preventing the other of the plurality of appliances from connecting to the operating supply.

2. The apparatus of claim 1, wherein said means for selectively connecting includes a plurality of logical circuits, each logical circuit being associated with a respective one of the plurality of appliances whereby, when one of said logical circuits indicates its respective appliance is in the ON state, each of said plurality of logical circuits associated with an appliance having a lower predetermined priority prevent the operating supply from being provided to their respective appliance.

3. The apparatus of claim 2, wherein said sensor associated with the apparatus having the highest priority provides the logical circuit associated with the appliance having a next highest priority with a signal indicative of the operating state of the apparatus having the highest priority.

4. The apparatus of claim 2, wherein said sensor associated with the apparatus having the highest priority provides the signal indicative of the operating state of the apparatus having the highest priority and its complement to the logical circuit associated with the appliance having a next highest priority.

5. The apparatus of claim 1, wherein the plurality of appliances are selected from at least one of gas powered devices, electrical devices, rooms having HVAC ductwork.

6. The apparatus of claim 5, wherein the supply is selected from at least one of the oil, gas, electrical power, water, heated and cooled air.

7. The apparatus of claim 1, wherein the plurality of appliances are combined into a plurality of groups, each group having a predetermined priority, and the plurality of groups include a group for each possible combination of the plurality of appliances.

8. An apparatus for distributing an operating supply to a plurality of appliances, wherein the plurality of appliances are combined into a plurality of groups, each group having a predetermined priority, the predetermined priority for use of a group being determined with respect to each of the plurality of groups independent of amount of supply required to operate each of the plurality of groups, and the plurality of groups include a group for each possible combination of the plurality of appliances, the apparatus comprising:
a plurality of sensors, each sensor being connected to a respective one of the plurality of appliances for sensing an operating state of the respective appliance; and
means for selectively connecting the plurality of appliances together and to the operating supply in an order based upon a predetermined priority for each appliance, wherein said apparatus distributes an operating supply to appliances within a group having a highest priority and each appliance within the group determined to be in an ON state of operation and having a higher priority than any other of the plurality of groups and preventing the other of the plurality of groups from connecting to the operating supply.

9. The apparatus of claim 8, wherein said means for selectively connecting includes a plurality of logical circuits, each logical circuit being associated with a respective one of the plurality of appliances whereby, the operating supply is supplied to all appliances in a group having a highest priority and logical circuits indicating the appliance in the ON state.

10. The apparatus of claim 9, wherein providing of operating supply to said plurality of appliances not in the group supplied with operating supply is prevented.

11. The apparatus of claim 8, wherein the plurality of appliances are selected from at least one of gas powered devices, electrical devices, rooms having HVAC ductwork.

12. The apparatus of claim 11, wherein the supply is selected from at least one of the oil, gas, electrical power, water, heated and cooled air.

13. A system for selectively providing operating supply, said system comprising:
a processing device having a plurality of input ports and a plurality of output ports;
a plurality of switches, each switch being connected to a respective one of said plurality of input ports and providing a signal representative of operating state to said processing device; and
a plurality of appliances, each of said plurality of appliances being associated with a respective one of said plurality of switches and connected to a respective one of said plurality of output ports, each of said plurality of appliances being assigned a predetermined priority for use with respect to others of the plurality of appliances independent of amount of supply required to operate each of the plurality of appliances wherein, when at least one of said appliances is determined to be operating in an ON state, said processing device connects the one of the plurality of appliances operating in an ON state and having a highest priority to the operating supply and prevents the operating supply from being provided to other ones of said plurality of appliances having a lower priority.

14. The system of claim 13, wherein, when more than one of said plurality of appliances request operating supply at a same time, a one of said plurality of appliances requesting operating supply and having a highest priority is provided with the operating supply and allowed to turn on.

15. A method of distributing an operating supply to a plurality of appliances, the method comprising the steps of:
a) providing each of the plurality of appliances with a predetermined priority for use, the predetermined priority for use of an appliance being independent of amount of supply required to operate each of the plurality of appliances;
b) connecting the plurality of appliances in order of descending priority;
c) determining an operating state of an apparatus having a highest priority;
d) providing operating supply to the apparatus having a highest priority upon determining the apparatus having a highest priority is in an ON state of operation;
e) determining an operating state of an apparatus having a next highest priority upon determining the apparatus having a highest priority is in an OFF state of operation;
f) providing operating supply to the apparatus having the next highest priority upon determining the apparatus having a highest priority is in an OFF state of operation; and
g) repeating steps e) and f) providing operating supply to the apparatus having a highest priority and determined to be in an ON state of operation.

16. The apparatus of claim 15, wherein the plurality of appliances are selected from at least one of gas powered devices, electrical devices, rooms having HVAC ductwork.

17. The apparatus of claim 16, wherein the supply is selected from at least one of the oil, gas, electrical power, water, heated and cooled air.

18. A method of distributing an operating supply to a plurality of appliances, the method comprising the steps of:
a) providing each of the plurality of appliances with a predetermined priority for use;
b) dividing the plurality of appliances into a plurality of groups, the plurality of groups including a group for each possible combination of appliances;
c) providing each of the plurality of groups with a predetermined priority for use, the predetermined priority for use of a group being independent of amount of supply required to operate each of the plurality of groups;
d) connecting the plurality of appliances in a series connection according to priority;
e) determining an operating state of each apparatus; and
f) providing operating supply to each apparatus within a group having a highest priority when each apparatus within the group is determined to be in an ON state of operation.

19. The apparatus of claim 18, wherein the plurality of appliances are selected from at least one of gas powered devices, electrical devices, rooms having HVAC ductwork.

20. The apparatus of claim 19, wherein the supply is selected from at least one of the oil, gas, electrical power, water, heated and cooled air.

* * * * *